Oct. 4, 1955　　　　R. O. ROBINSON　　　　2,719,629
MAIL SORTING AND CANCELLING MEANS
Filed Sept. 1, 1951　　　　　　　　　　　　6 Sheets-Sheet 1

INVENTOR.
Roy O. Robinson.
BY
Albert J. Fihe
ATTORNEY.

INVENTOR.
Roy O. Robinson.
BY Albert J. Fihe
ATTORNEY.

Oct. 4, 1955    R. O. ROBINSON    2,719,629
MAIL SORTING AND CANCELLING MEANS
Filed Sept. 1, 1951    6 Sheets-Sheet 4
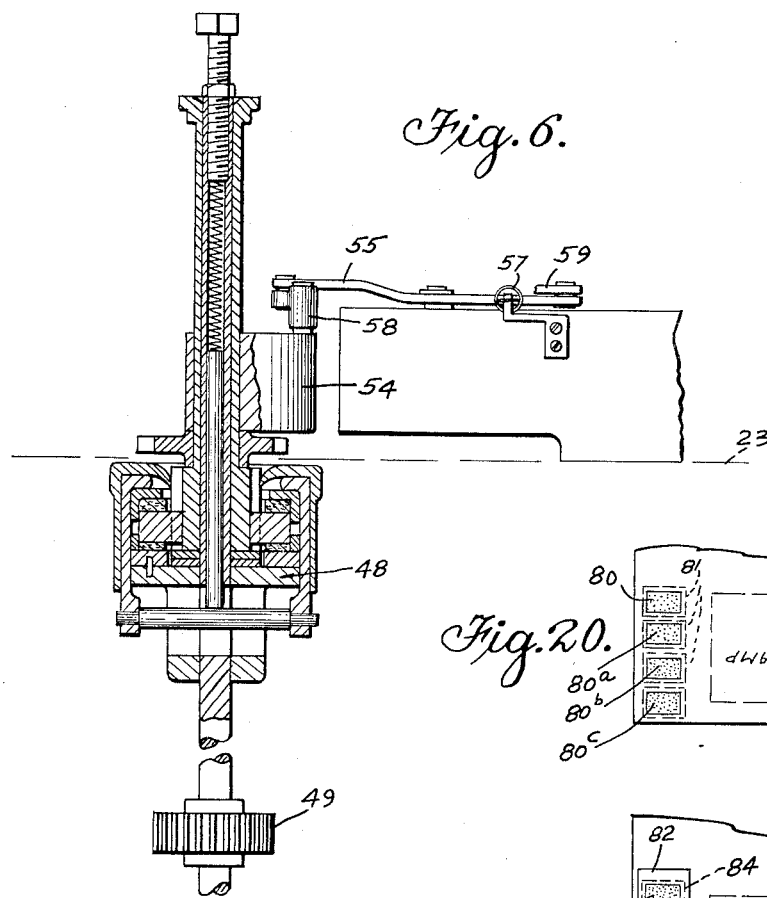
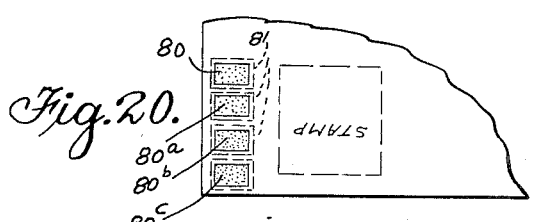
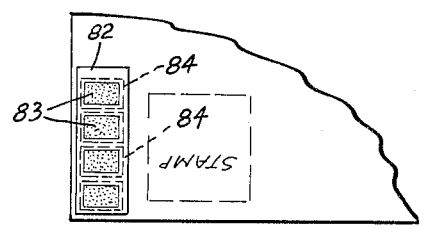
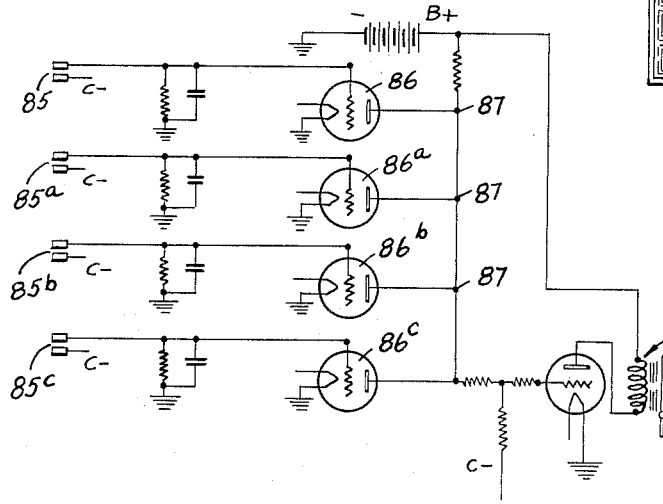
INVENTOR.
Roy O. Robinson.
BY Albert Frihe
ATTORNEY.

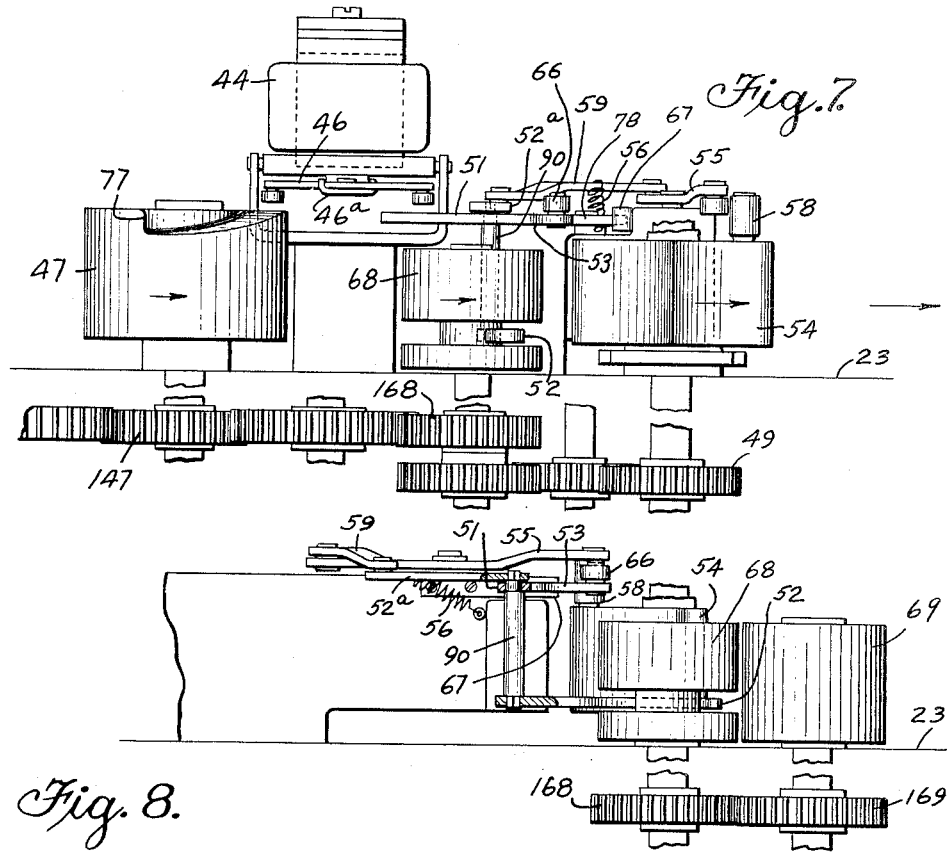

Oct. 4, 1955 — R. O. ROBINSON — 2,719,629
MAIL SORTING AND CANCELLING MEANS
Filed Sept. 1, 1951 — 6 Sheets-Sheet 6
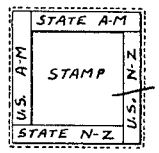 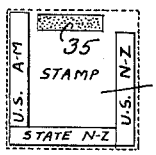 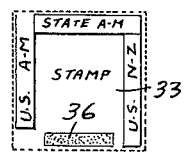 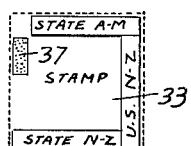 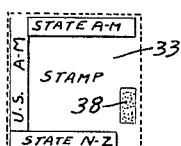
Fig. 10.   Fig. 11.   Fig. 12.   Fig. 13.   Fig. 14.
Fig. 15.     Fig. 16.
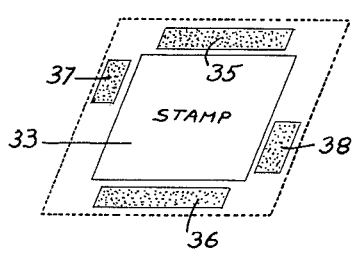 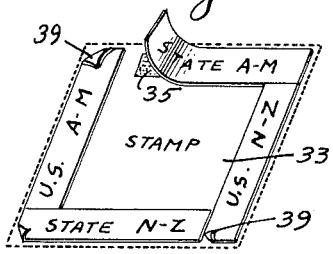
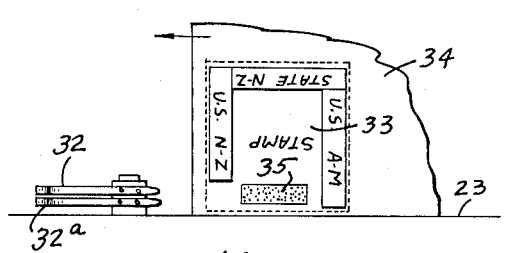 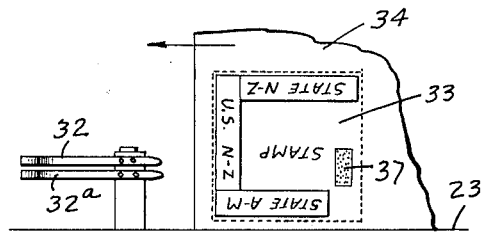
Fig. 17.     Fig. 18.
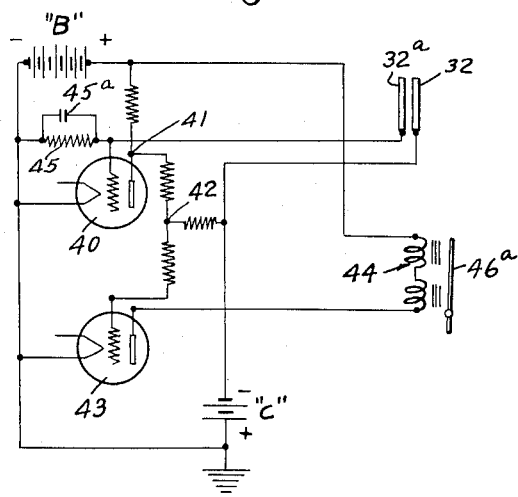
Fig. 19.
INVENTOR.
Roy O. Robinson.
BY Albert J. Fihe
ATTORNEY.

United States Patent Office 2,719,629
Patented Oct. 4, 1955

2,719,629

MAIL SORTING AND CANCELLING MEANS

Roy O. Robinson, Burbank, Calif.

Application September 1, 1951, Serial No. 244,824

5 Claims. (Cl. 209—72)

This invention relates to an improved mail sorting and cancelling means, and has for one of its principal objects the provision of a device whereby letter mail will be practically automatically sorted according to its destination, and at the same time have the stamp cancelled.

One of the important objects of this invention is the provision of means whereby a person mailing a letter will perform a certain type of operation thereon, which, when completed on the letter, will assist in automatically sorting said letter from others in any group, and will classify the same as to destination.

Another object of the invention is to provide a type of automatic sorting indicia in conjunction with the postage stamp, whereby the sender of the letter will provide an electrical conductor on the envelope, preferably at a point adjacent the stamp, and wherein said electrical conductor will actuate a portion of the mechanism of the sorting means, whereupon the letter will be automatically grouped with others intended for a certain or similar destination.

Yet another object of the invention is to provide a plurality of electrical conducting strips on an envelope to be mailed, one of which said strips is to be uncovered by the sender, whereupon, when the letter is passed through the sorting device of this invention, it will be automatically started toward the indicated destination.

Another and still further object of this invention is to provide a machine for automatically sorting the mail so marked for distribution and which will be electrically controlled for practically instantaneous operation, and which will, at the same time, cancel the stamp and affix a post mark.

Other and further important objects of the invention will be apparent from the disclosures in the accompanying drawings and following specification.

The invention, in a preferred form, is illustrated in the drawings and hereinafter more fully described.

In the drawings:

Figure 6 is a detail view, partly in section, illustrating the construction of the clutch, which serves to drive a single rotation cam for initiating a guiding operation.

Figure 7 is a side elevation of a part of the structure shown in Figures 3, 4 and 5, illustrating in more particularity the solenoid, the gears and operating cams and levers, looking along the line 7—7 of Figure 3.

Figure 8 is a detail view of a portion of the structure of Figure 3, showing the same along the line 8—8 of that figure.

Figure 9 is an enlarged view of the solenoid, or electromagnet, which, when electrically actuated, will act to operate the mechanism to divert a particular letter to its indicated channel.

Figure 1:
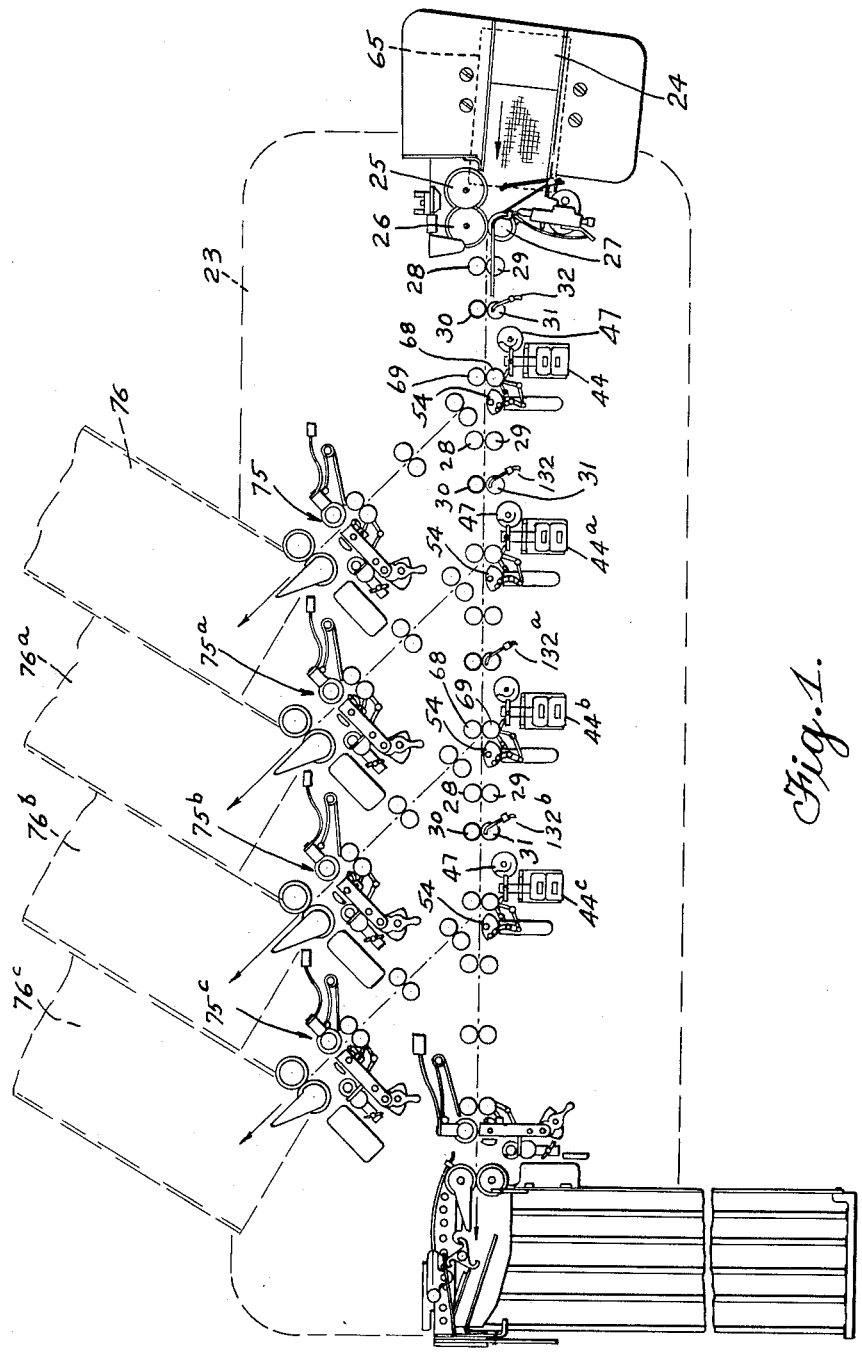
Figure 1 is a top plan view of the improved mail sorting and cancelling machine of this invention.
Figure 2:
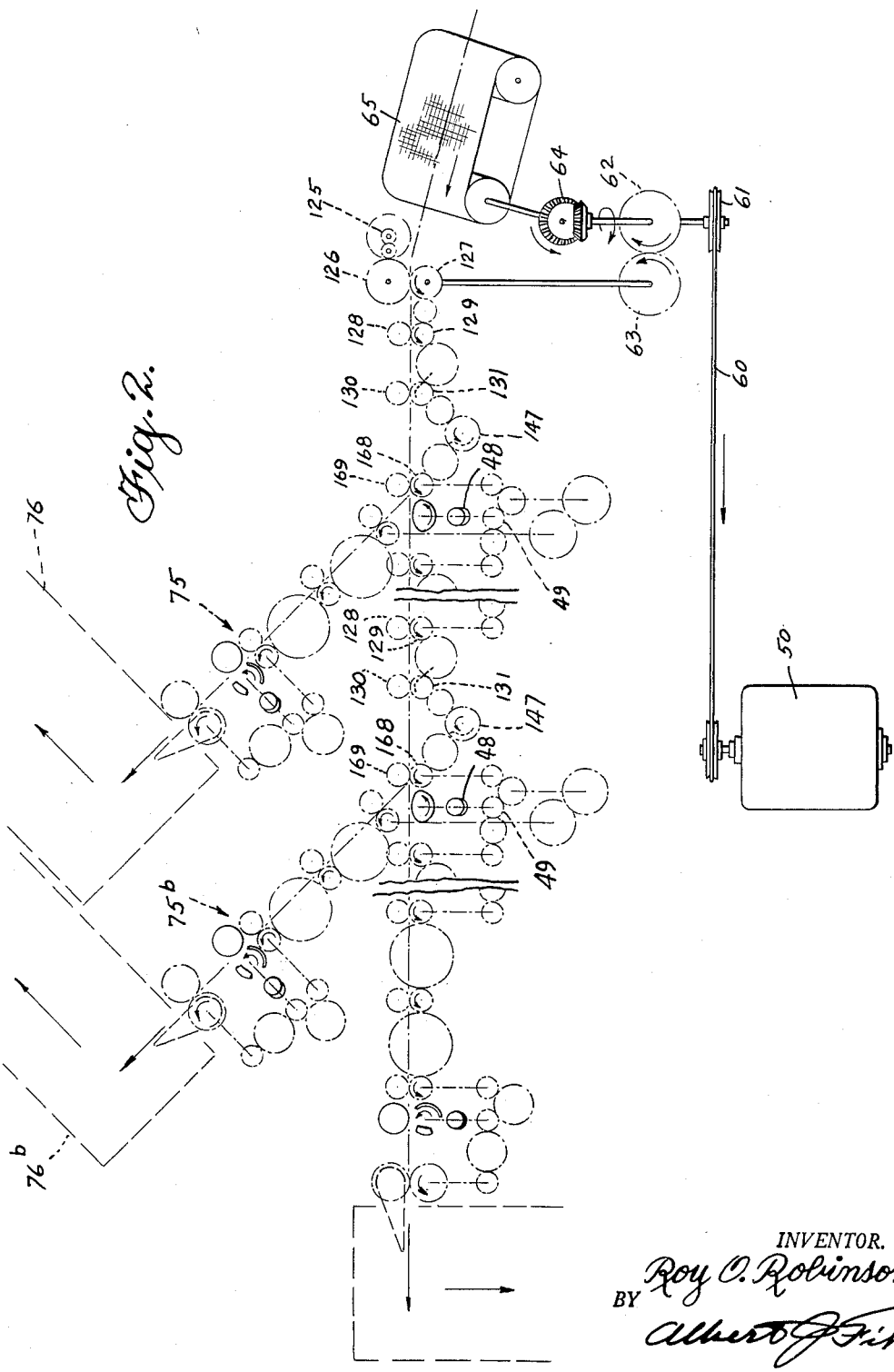
Figure 2 is a somewhat diagrammatical view, parts being broken away, showing the gears and other driving mechanism for the apparatus illustrated in Figure 1.

Figures 10 to 14 inclusive illustrate a certain type of postage stamp which is adapted to cooperate with the machine of this invention in order to automatically sort letters into a desired channel or toward a particular designation.

Figure 15 illustrates a slightly modified form of the stamp shown in Figures 10 to 14.

Figure 16 illustrates one of the postage stamps of this invention and shows how the same is primarily treated in order to guide the letter, to which it is attached, into a particular channel for distribution.

Figure 17 shows a letter with the stamp of Figure 16 thereon, passing through the machine and about to be detected for guiding into a certain channel.

Figure 18 illustrates a letter with another pre-designating stamp thereon, about to be detected for guiding into a different channel.

Figure 19 is a wiring diagram showing the electrical apparatus, by means of which, the current flow instigated by the particular stamp is amplified and is employed to route the attached letter.

Figure 20 illustrates a slight modification of the invention, wherein the indicia for guiding the letter to a certain designation is placed on the envelope and covered rather than forming part of the stamp.

Figure 21 shows another modification, wherein there is provided a printed tape with tear-off strips, which can be applied to any envelope in a designated space for the purpose of routing the same.

Figure 22 is another wiring diagram, which is employed for a more complex routing of letters in accordance with the spirit of this invention.

As shown in the drawings:

The reference numeral 23 indicates generally the bedplate or actual working surface of the improved mail sorting and cancelling machine of this invention. This is surmounted by a chute 24, in which letters to be sorted are placed for the initial operation. As is usual in these cancelling machines, the letters are set on edge and inserted in groups, the innermost letter being then pushed against a pair of feeding rollers 25 and 26 by a belt 65. A driven roller 27 is opposite the feeding roller 26. The letter then passes between another pair of accelerating rollers 28 and 29, and a succeeding pair 30 and 31. Cooperating with this succeeding pair of rollers 30 and 31 is a detector element 32, composed of two brushes, which comprises a current carrying switch leading to an amplifying system. This is better shown in Figure 19.

The switch element has two contact points 32 and 32a, as illustrated in Figures 17, 18 and 19, and these are separated a slight distance so that they are not in current carrying contact.

A type of stamp adapted to be used in conjunction with the sorting machine of this invention is illustrated in Figures 10 to 14 inclusive, and is preferably of square or rectangular shape, having, in addition to the usual markings, marginal portions marked in a pre-determined manner. For example, the stamp 33 is surrounded by four strips, one on each edge. One of these strips is marked "State A–M." Another is marked "State N–Z." Still another is marked "U. S., A–M" and the last is marked "U. S., N–Z." These marked strips are preferably adhesively applied to the marginal edges of the stamp, and any one of which can be torn off to expose a strip of current carrying material such as that shown at 35 in Figure 11. This can be metal foil, graphite, a sprayed metallic powder or any conducting material. The exposure of one of these strips means, for example, that the sender of the letter has torn off the covering material from the strip 35 to indicate that the letter is addressed to some point in the local State and to a city or town, the first letter of the name of which is somewhere between A and M in the alphabet.

If the strip shown at 36 in Figure 12 is removed, the letter is accordingly to go to some point in the local State, the initial letter of the name of which is somewhere between N and Z inclusive.

If, however, the letter is addressed out of that local State, the strip 37 is exposed as shown in Figure 13, and this will mean some State in the United States, the name of which begins with one of the letters A to M inclusive.

Further, the strip 38 may be removed indicating that the letter is destined to some State in the United States outside of the local State, the initial letter of the State being somewhere between N and Z inclusive. Small tabs may be incorporated into the strips as shown at 39 in Figure 16 in order to make removal of same more easy, or the same may be perforated for the same purpose. The conducting strips, with all the tabs removed, are shown at 35, 36, 37 and 38 in Figure 15, and it will be noted that the conducting strips 37 and 38 are only half the length of the strips 35 and 36. This is in order to allow of a variable height spacing of the switch points 32 and 32a, whereby desired indicated current contacts may be made. For example, the letter shown in Figure 17 has the conducting strip 35 exposed, which means that the letter is to be delivered somewhere in the local State and to a town, the first letter of the name of which is somewhere between A and M inclusive.

The letter shown in Figure 18 has the conducting strip 37 exposed, which means that the letter is intended to be delivered to some State in the United States, the first letter of the name of which is somewhere between N and Z inclusive. This exposed strip is just half the extent of the strips 35 and 36, because room must be left on the stamp for a correspondingly exposed strip 38 covering States whose names begin with the letters N to Z inclusive, while at the same time allowing for a corresponding height spacing of the switch contact elements 32 and 32a. In this manner, any one of four distributive points or sections of the State of country may be indicated by the sender of the letter, and if the letter is addressed to a point in the local city, no strips need be exposed, thereby allowing of five different variations of address designations.

In Figure 19, brush contacts 32 and 32a are connected to tubes 40 and 43, resistor 45, condenser 45a and solenoid 44, said solenoid having an armature 46a. The junction 41 adjacent the tube 40 is effectively at ground potential and the tube 40 is without bias.

The current passing through the exposed contacting strip is, of course, very light, but this can be amplified in any suitable manner, such as, for example, by way of the apparatus shown in Figure 19. In this diagram, the tube 40, operating without bias, will be conducting heavily. Its internal plate resistance is, by design, quite low. Hence, when the tube is so conducting, the junction 41 is effectively at ground potential. The junction 42 and the grid of the tube 43 will have approximately one-half the C-voltage present. This voltage is, by design sufficiently negative to control the current flowing through the wiring of a solenoid or electro-magnet 44, and the rest of the plate circuit of the tube 43, so that the magnetic pull is not sufficient to move the armature of the element 44.

When the conducting surface appears across the brush contacts 32 and 32a, the C-voltage on one brush is connected by said conducting surface to the grid of the tube 40 and across the combination of the resistor and condenser 45 and 45a. The impedance of the C-source is very low so that the condenser 45a receives the negative charge. At least this is so during the time that the conducting surface bridges the brushes 32 and 32a, and this is sufficient to effectively bias the tube 40 to cut off. After the conducting surface on the letter has passed the brushes 32 and 32a, the charge on the condensor 45a remains sufficiently large and for a sufficient time to bias the tube 43 so that its plate will allow current from the battery "B" to energize the electro-magnet 44 to move its armature through a desired cycle.

It will be evident that the tube 40 merely acts as a switch for either placing or removing a ground at the junction 41. Since this tube is controlled by the conducting surface on the letter, such conductive surface effectively becomes the switch controlling the magnet 44.

As shown in Figure 1, there are four magnets or solenoids 44, 44a, 44b and 44c, and this number may be varied depending upon the type of stamp used and also depending upon the particular local problem so far as sorting of the mail is concerned.

When the armature of the magnet 44 is so actuated, one end of the pivoted arm 46a will be moved up, and the other end will move down. (Figure 9.)

Figure 4:
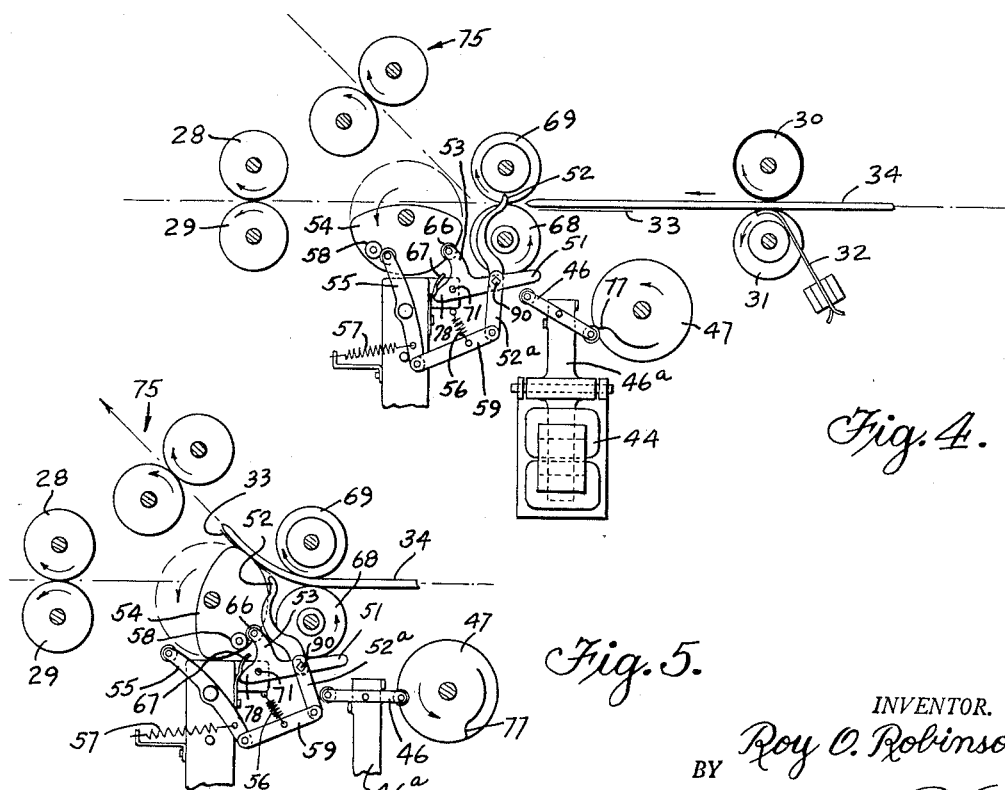
Figure 4 is a view similar to Figure 3, but showing the parts in a slightly different position, due to action after detection.

This drops the lever 46 down to a level at the upper surface of a continually rotating circular cam element 47. This element 47 is provided with an inclined cam surface in its top terminating in a shoulder 77 and is driven by the continually rotating shaft and gear 147, so that the armature 46a will place lever 46 as to engage this cam surface and the shoulder 77 to propel the lever 46 around its pivot point on the armature 46a as shown in Figure 4. The other end of the lever 46 will then push one arm 51 of the bell-crank lever 51—53 outwardly.

The bell-crank lever 51—53 is pivoted at 71 and is provided with an integral extension 78 which is normally in contact with a recess in the front end of a leaf spring 67. The action previously described moves this projection out of the recess in the outer end of the leaf spring 67 and into the unrestricted position shown in Figure 4. At the same time the outer end of the stop element 52 is moved into a position almost in line with the direction of movement of the letter 34, the exposed strip of which has caused the actuation of the previously described mechanism.

When the element 52 is moved forwardly with its outer end almost in the path of the letter 34, the helical spring 56 will further act to move the projecting end of the element 52 into actual letter deflecting position, but this spring is not of sufficient strength to cause any undesirable perforation of any letter which might be contacted by the projection 52.

At the same time, the roller 66 on the other arm 53 of this bell-crank lever is moved into a position over the upper surface of an oval shaped deflector or cam element 54, which is provided with a roller projection 58 on and extending above its upper surface adjacent its periphery.

The envelope contact element 52 has a rearward and upper extension 52a to which it is connected by a vertical shaft 90. This extension 52a is connected to the link 59, and the arm 51 of the bell-crank pivots around the connecting shaft 90 while at the same time moving with it. The connections between the upper and lower ends of the shaft 90 with the portions 52a and 52 respectively are sufficiently rigid so that a unitary movement of these parts is assured at all times. Both ends of the shaft 90 are squared and fitted into correspondingly squared holes in the members 52 and 52a by welding or otherwise so that a proper desired simultaneous movement of both parts will always result.

Figure 3:
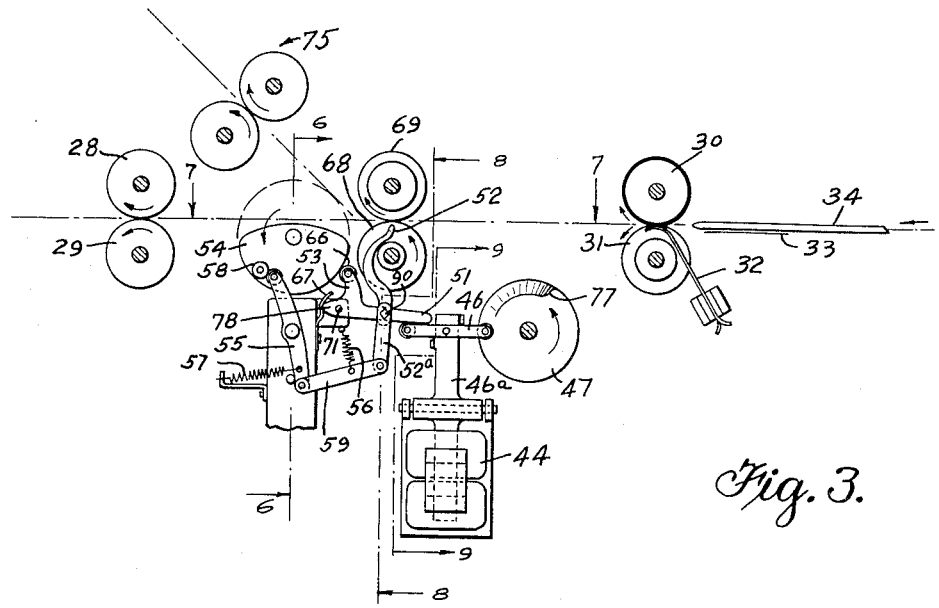
Figure 3 is a detail view illustrating the essential operating parts of the sorting mechanism which forms an important feature of the invention.
Figure 5:
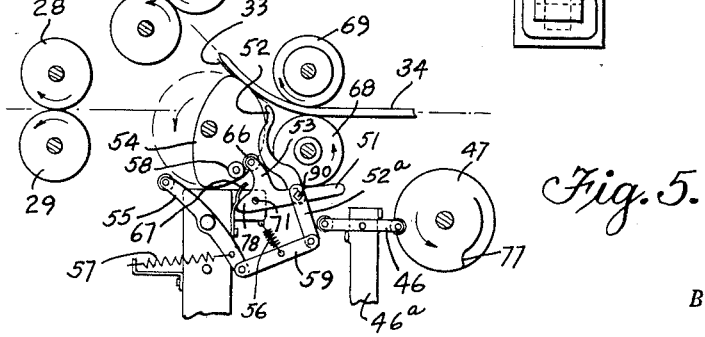
Figure 5 illustrates the parts of Figures 3 and 4 just before returning to their original position after a letter has been detected and guided to a particular channel by means of the device shown.

Furthermore, the above described movement of the element 52 and the bell-crank 51—53 will cause the link 59 to pull the lever arm 55 around its pivot point against the action of the control spring 57. This arm 55 has a roller at its free end which is normally in stop engagement with the pin or roller 58 which propects above the upper surface of the oval shaped cam element 54. This pivoting action of the lever 55 frees the oval shaped cam element 54 for movement, allowing it to be then rotated by the action of a clutch element 48 (Figure 6). This clutch is continually driven by means of a gear 49 in mesh with the remainder of the driven mechanism and the release of the oval shaped cam element 54 by withdrawal of the end of the lever 55 from contact with roller projection 58 will allow this oval shaped element to turn, and it will assume the position shown in Figure 5. At this point in the rotation of the oval cam 54, the roller projection 58 will contact the roller projection 66 on the end of the bell-crank arm 53, moving the same back into its original position as shown in Figure 3, and at the same time returning all the other associated elements to their original positions. A spring 79 returns the armature 45 to its normal relationship (Figure 9).

When this occurs, the projecting roller at the end of the lever 55 is moved back into the path of the projecting roller 58, and the oval shaped cam 54 is accordingly stopped after completing a single revolution.

In the meantime, however, one surface of this cam element 54 has been projected into the path of the advancing letter 34, the circuit carrying contact of which originally instigated the operation of this particular phase of the sorter, and the letter will accordingly be deflected to a desired channel as explained above, and finally cancelled by the mechanism 75, or 75a, or 75b or 75c. The letter is then delivered to a corresponding receptacle 76, 76a, 76b or 76c. The cancelling and postmarking mechanism is of a consrtuction already in use and forms no part of the present invention, except that it is associated with the automatic sorting mechanism in order to complete the required operations as indicated by postal rules and regulations.

In Figures 20 and 21 there is shown two slightly modified forms of the invention which will perform the same desired function but in a slightly different manner. In these modifications no special type of stamp need be employed, because the current carrying contact means are applied directly to the envelope preferably at points adjacent the stamp and at the leading edge of the envelope.

In Figure 20, the current carrying elements are applied directly to the envelope as indicated at 80, 80a, 80b and 80c, and these are individually covered by removable tear-off strips 81, etc. The current carrying means may be anything which will serve the purpose and these are spaced sufficiently apart to insure proper operation. The cover strips 81, etc are printed with indicia indicating the proposed destination of the letter, all as previously described, and the removal of anyone of hte strips will accomplish the same purpose as removal of anyone of the strips on the stamp 33, shown in Figures 10 to 16 inclusive.

In Figure 21 a previously printed adhesive tape 82 is provided having a series of conducting strips 83 thereon, each of which is covered with a removable strip 84, etc, printed to indicate various destinations. The entire strip is applied to the letter, a particular covering is then removed.

Furthermore, a series of indicated spaces may be printed on the letter adjacent its leading edge, and anyone of these spaces may be covered with a current carrying strip, whereby the destination is indicated.

The number of indicated designations can be increased to a considerable extent within reasonable limits, and detection of anyone of a reasonable number of designated states or even cities may be accomplished by a slightly more complex system of current detecting and amplifying means.

One of such systems is outlined diagrammatically in Figure 22, wherein a number of detector brushes, for example four, are shown at 85, 85a, 85b and 85c.

Each of these switches is associated with a tube 86, 86a, etc., and it follows that if one or more of these tubes 86 conducts, the junction 87 will be at ground potential. Hence, to operate an electro-magnet 88, a conducting surface must appear across each set of brushes 85, 85a, etc., simultaneously. In order to effect a given separation, the person mailing the letter would expose any or all of the current carrying strips 80, etc., or 83, etc., or any combination of same.

By eliminating the tube 86b, a further separation could be obtained, whereby switches 85, 85a and 85c would effect operation of the final sorting mechanism when exposed. Such a combination of detector brushes and individual tubes would provide, in geometrical relationship, almost any desired selection within reasonable limits. For example, two tubes would permit of separation into three classes, one for each tube and one for no markings. Three tubes would permit of a separation into seven classes, six by way of the tubes and one for no markings. Four tubes would permit of a separation into twenty-five classes, twenty-four by way of the tubes and one for no markings. Five tubes would permit of separation into one hundred and twenty-one classes and so on.

It will be evident that herein is provided a mail sorting mechanism which, when associated with the usual and necessary stamp cancelling and postmarking apparatus, will permit of an enormous saving of time and labor, which has heretofore been considered indispensible in the sorting of mail at postoffices. Furthermore, no matter how skilled and careful an operator may be, mistakes will occur and sometimes cause expensive delays.

Additionally, the means by which the sender of the letter can, at the time of affixing the stamp, indicate a certain place or territory for which the letter is designated, will require the expenditure of a very negligible amount of time on the part of each individual, which, however, obviously would require the expenditure of an enormous amount of time when the letters must be sorted by only a few operators at the postoffice. This is especially true in larger offices or at times when the mail is heavy.

In the event that the stamp with tear strips is found impractical, the tear strips can be affixed to the envelope and the operation will be the same and fully as satisfactory.

The mechanism, both mechanical and electrical, is relatively simple, positive in operation and not likely to get out of order. Upkeep by anyone skilled in the art is readily accomplished, even if parts eventually wear out, and parts may be replaced in a minimum time. Even circulars may be sorted by the mechanism of this invention.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. A mail deflecting and cancelling mechanism including mechanical feeding means for the letters, a number of channels beyond the feeding means, an electrical detector adjacent the feeding means, mechanical means including an electro-magnet operated by the action of said detector to deflect a letter into a predetermined channel in accordance with metallic insignia previously indicated on the letter, said insignia being adjacent the postage stamp on the letter, said electro-magnet being energized by an amplified current controlled by the detector through action of the current metallic carrying means on the letter, a motor for driving the feeding and sorting mechanism, said sorting mechanism moving into operative relationship by electrical means in circuit with the detector, the sorting mechanism including a continually rotated cam, a one revolution cam, a bell crank and connected lever means for intermittently releasing said one revolution cam, an armature movable when the electromagnet is energized to act upon the continually rotated cam, so that one end of the armature strikes the bell-crank, a rotated clutch member, said single revolution cam forming part of the clutch.

2. A device as described in claim 1, wherein the armature of the magnet includes a pivoted arm intermittently operably connected with the continually rotating cam, and wherein the bell-crank and its levers connect the continually rotating cam with the clutch driven cam, one of said levers including an envelope contacting finger.

3. A device as described in claim 2, wherein a helical spring connected to the contact finger impels the same into the path of a sorted letter to preliminarily direct its desination and wherein the levers move the clutch driven rotating cam into the path of said letter after preliminary operation of the finger detector means to finally guide the letter into its predetermined channel.

4. A device as described in claim 3, wherein a deflecting lever and a spring are provided to assist in the preliminary deflecting movement following the instigation of such movement by said electrical and mechanical means, and a socketed leaf spring for preventing contact of the contacting finger from actual contact with a letter preliminary to the action of the first named spring.

5. A device as described in claim 4, wherein a spring is connected to the pivoted armature for returning the same ot normal position after inaugurating a letter sorting operation, and wherein the continually rotating cam includes an integral shoulder in its upper surface, said shoulder being operably connected to one end of the arm pivotally mounted on the outer end of the armature.

References Cited in the file of this patent

UNITED STATES PATENTS

| | | |
|---|---|---|
| 1,217,092 | Hopp | Feb. 20, 1917 |
| 1,729,521 | Roddy | Sept. 24, 1929 |
| 1,985,035 | Kermode | Dec. 18, 1934 |
| 2,056,382 | Ayres et al. | Oct. 6, 1936 |
| 2,063,230 | Crady | Dec. 8, 1936 |
| 2,369,794 | Phinney et al. | Feb. 20, 1945 |
| 2,395,482 | Hurley | Feb. 26, 1946 |
| 2,570,288 | Todd | Oct. 9, 1951 |
| 2,609,928 | Doust | Sept. 9, 1952 |
| 2,697,514 | Stahl | Dec. 21, 1954 |
| 2,709,001 | Stahl | May 24, 1955 |